United States Patent [19]

Claassen et al.

[11] 4,274,858
[45] Jun. 23, 1981

[54] MOLDS FOR PRESS BENDING GLASS SHEETS

[75] Inventors: George R. Claassen, New Kensington; Raymond J. Mickelic, Springdale, both of Pa.

[73] Assignee: PPG Industries, Inc., Pittsburgh, Pa.

[21] Appl. No.: 115,965

[22] Filed: Jan. 28, 1980

[51] Int. Cl.³ .............................................. C03B 23/03
[52] U.S. Cl. ........................................ 65/273; 65/287; 65/290; 65/374 R; 65/374 RM
[58] Field of Search ................. 65/104, 106, 273, 287, 65/290, 374 R, 374 RM

[56] References Cited

U.S. PATENT DOCUMENTS

| | | | |
|---|---|---|---|
| 3,367,764 | 2/1968 | Seymour | 65/291 |
| 3,512,953 | 5/1970 | Roseman | 65/287 |
| 3,586,493 | 6/1971 | Claassen | 65/374 RM X |
| 3,819,351 | 6/1974 | Shaffer et al. | 65/273 |
| 3,871,857 | 3/1975 | Claassen | 65/273 |
| 4,018,589 | 4/1977 | Egbert et al. | 65/287 |
| 4,052,185 | 10/1977 | Kolakowski | 65/106 |
| 4,052,188 | 10/1977 | Seymour | 65/273 |
| 4,071,345 | 1/1978 | Werner et al. | 65/273 |
| 4,082,530 | 4/1978 | Seymour | 65/273 |
| 4,108,624 | 8/1978 | Claassen | 65/273 |

Primary Examiner—Arthur D. Kellogg
Attorney, Agent, or Firm—Donald Carl Lepiane; Edward I. Mates

[57] ABSTRACT

In fabricating a press bending mold having a flexible metal shaping member such as a plate or a frame, a reinforcing grate and adjustable attachment means extending through certain apertures in the reinforcing grate to adjust the shape of the metal shaping member, localized distortion of the shaping member that formerly occurred when the attachment means were bonded to the shaping member by welding or soldering is eliminated by using a thermosetting adhesive capable of application at room temperature, such as an epoxy resin adhesive, to bond the attachment means to the flexible metal shaping member. When the former and the latter have bonding surfaces composed of aluminum, an epoxy resin containing finely divided aluminum filling is preferred.

7 Claims, 5 Drawing Figures

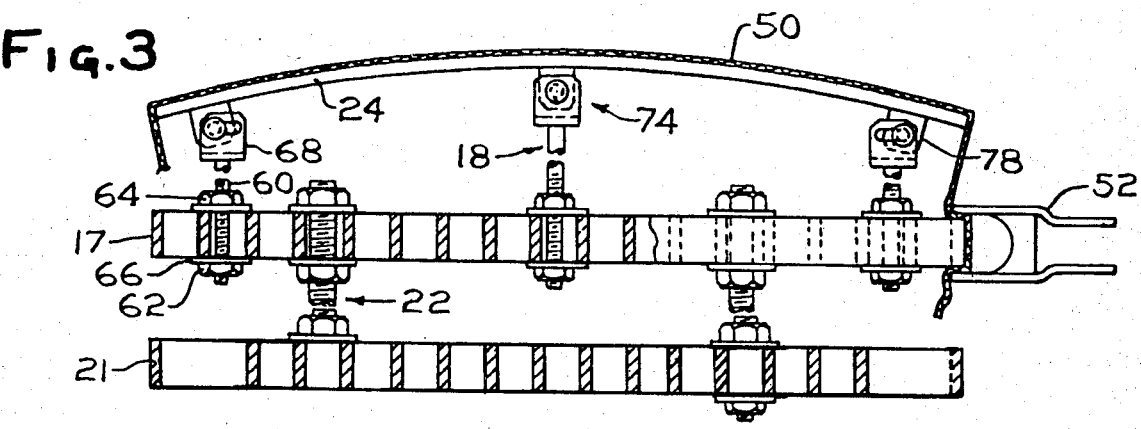
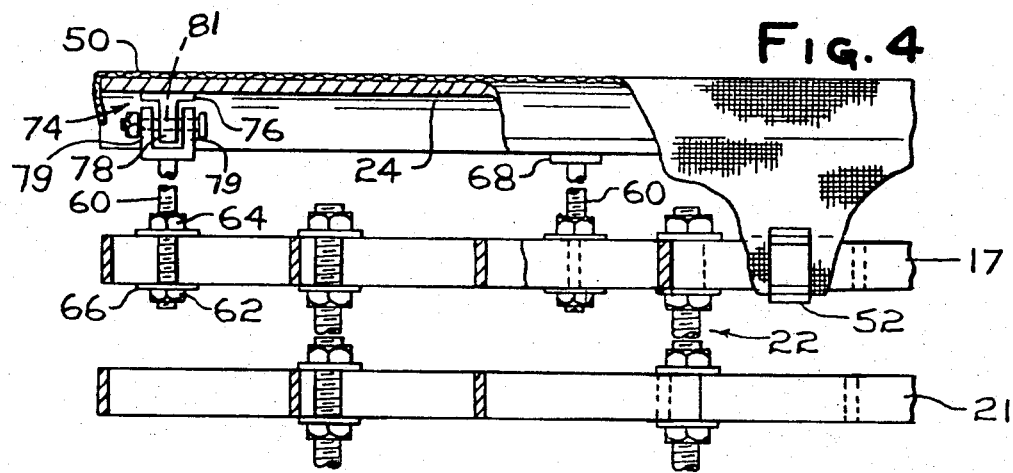
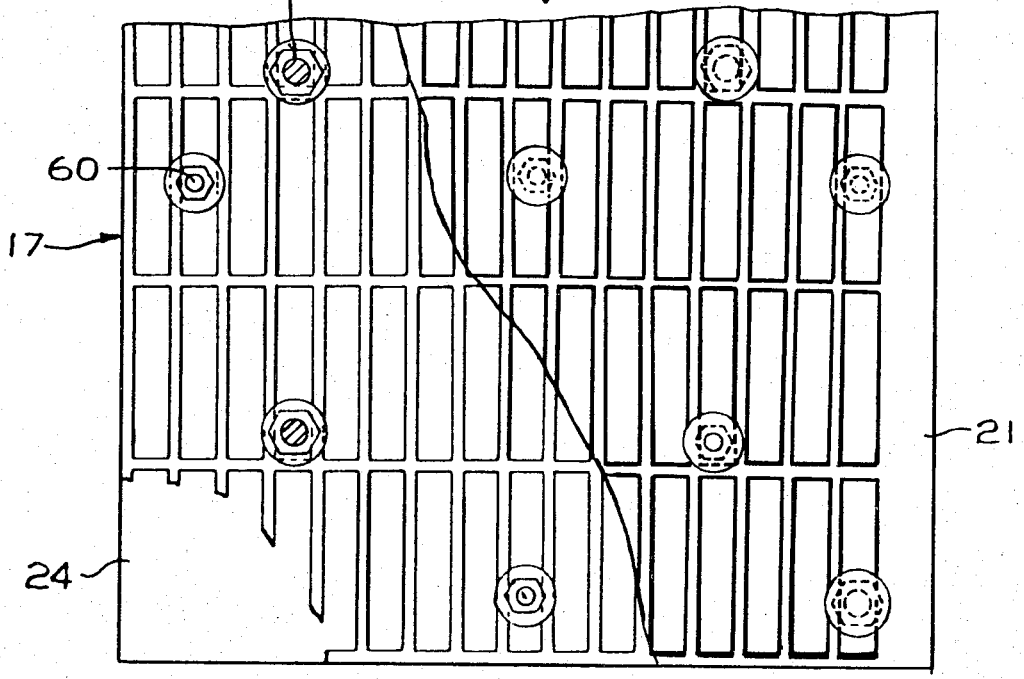

MOLDS FOR PRESS BENDING GLASS SHEETS

BACKGROUND OF THE INVENTION

1. Field of the Invention

The present invention relates to shaping glass sheets and particularly to a method of fabricating apparatus for shaping glass sheets by a press bending operation which apparatus is relatively inexpensive to fabricate, yet capable of producing sample patterns of bent glass sheets within precise tolerances. Though the present invention originated to solve problems existing in the shaping of glass sheets, it is understood that the principles of the present invention may be employed for shaping sheet material other than glass when the sheet material is softened sufficiently for shaping.

Glass sheets or plates have been bent by supporting the sheet to be bent between a pair of glass shaping members while at a temperature sufficiently high to be deformable by pressurized contact between a pair of glass shaping members having major complementary shaping surfaces conforming to the shape desired for the bent glass. In the past, the glass shaping members were of either solid metal or refractory members.

Glass shaping members fabricated of solid metal are costly to fabricate. The fabricated parts are not suitable to produce patterns other than the one for which they are originally made, except for a family of glass sheets of uniform radius of curvature but of different sizes. Furthermore, an expensive and time consuming grinding operation is needed to correct the shape of any high spots on the shaping surface and it is necessary, in order to correct for any low spot relative to the shaping surface of the shaping member, to grind a considerable portion of the shaping surface to compensate for the low spot.

2. Description of Patents of Interest

U.S. Pat. No. 3,367,764 to Seymour provides glass shaping apparatus of the press bending type that is easily adjustable to change its shape in the event glass sheets are bent slightly out of tolerance without requiring grinding of the shaping surface or dismantling of the entire apparatus. In addition, the Seymour patented apparatus is capable of simple adjustment to produce several different configurations that are not too dissimilar from one another.

Each glass shaping member of an illustrative embodiment of the apparatus patented to Seymour comprises a relatively flexible shaping plate of metal having a pressing face whose shape approximates that of the shape desired for the glass sheet after bending. The relatively flexible shaping plate extends substantially continuously throughout substantially its entire extent and has sufficient rigidity to resist deformation during pressurized engagement against a heat-softened glass sheet.

The patented apparatus also comprises a relatively rigid member in the form of a rigid, more massive metal plate having an area at least substantially coextensive with that of the relatively flexible metal plate located in spaced relation behind said relatively flexible metal plate and of a thickness of approximately ½ inch. Attachment means is distributed throughout the extent of the relatively flexible metal plate and the relatively rigid metal plate for connecting the plates in spaced relation to one another, for insuring positive alignment of the central portion of the shaping plate to the corresponding portion of the rigid plate while permitting the shaping plate to expand thermally without distorting from its desired local configuration, and for making slight alterations in the shape of the relatively flexible metal plate without altering the configuration of the relatively rigid metal plate. The space between the shaping plate and the rigid plate permits access to adjust the attachment means. Such adjustment changes the local contour of the shaping plate by altering the distance between the shaping plate and the rigid plate in the vicinity of the attachment means that is adjusted. The rigid plate of the Seymour apparatus is fixed in spaced relation to a rigid mounting plate. The latter is attached to a piston for movement therewith.

In the fabrication of adjustable press bending apparatus of the type patented by Seymour in the aforementioned patent, one end of each attachment means is rigidly attached by welding or soldering to the rear surface of the flexible metal plate while the other end portion extends through an opening in the relatively rigid plate and is secured to said plate by adjustable securing members, each comprising a threaded shaft extending through an opening in the rigid plate and adjustment nuts threaded onto the shaft on each side of the rigid metal plate.

The holes drilled in the rigid metal plate to receive the end portions of the attachment means are located in proper alignment with the locations where the adjustable securing members are secured to the rear face of the flexible metal plate whose pressing face has a shape that conforms to a particular pattern. However, these locations of the holes in the rigid plate may be unsuitable for use with a flexible metal plate whose pressing face has a shape that conforms to another pattern. Hence, when production requirements for a particular pattern are ended and production begun on a new pattern, it becomes necessary to store the flexible metal plate with the rigid metal plate until the production program requires producing the particular pattern again. Storage space becomes a problem in a plant producing many different patterns of curved glass windows for autos and other uses. Furthermore, the cost of the relatively massive rigid metal plates adds considerably to the cost of the inventory of press bending molds that must be stored when not in use. Also, the mass of the rigid metal plates necessary to insure sufficient rigidity to insure that the flexible metal plates rather than the rigid metal plates change their shape when the attachment means are adjusted must necessarily be so great as to impose a burden on the apparatus that actuates the press bending molds to move between a retracted position and a glass engaging position. Hence, the maximum speed at which the press bending molds move between these positions must be controlled to limit inertia problems. This may increase the time needed for each bending cycle, thus reducing the rate at which bent glass sheets can be produced successfully.

U.S. Pat. No. 3,871,857 to Claassen provides a press bending apparatus particularly suitable for use in shaping heat-softened glass sheets that has an adjustable pressing mold as in the Seymour patent or an adjustable pressing frame, but is lighter in weight and has a rigid member adapted for use with several different flexible metal plates whose shapes conform approximately to different production patterns. Storage space needed for unused press bending mold structures comprising a flexible metal plate is reduced considerably and the total mass of the press bending mold structure stored (relatively flexible metal plate or frame with the press face plus that of the relatively rigid reinforcing member and attachment means) is considerably less than that of a similar press bending apparatus conforming to the Seymour patent.

The Claassen patent obtains these benefits by using an open grate instead of a heavy plate as a reinforcement for the relatively flexible plate provided with the press face. The open grate reinforcement is thicker than the reinforcement plate of the Seymour patent but has less weight because of the open areas throughout the grate.

The use of a thicker but lighter metal grate as a reinforcing member for an adjustable shaping plate as in the Claassen patent avoids the need for punching holes in the reinforcing plates to receive the adjustable attachment means that attach the rigid member to a shaping plate or frame and those needed to receive the mounting bolts that attach the rigid plate to the mounting plate, which latter plate is attached to move with a piston rod. Furthermore, adjusting the shaping plate or frame is easier with a reinforcing grate rather than a solid reinforcing plate because an operator can see what he is doing more easily through the apertures of a grate when he adjusts the shaping face of a press bending member provided with a grate rather than a solid plate as its reinforcing member. Furthermore, it is unnecessary to dismount the reinforcing grate together with the shaping plate or frame from attachment to the mounting plate whenever production changes require a change in the flexible metal shaping plate or frame. It is only necessary to remove the flexible metal shaping plate or frame conforming to the old production pattern from the grate and attach a flexible metal shaping plate or frame conforming to the new production pattern to the grate, which latter remains permanently attached to the mounting plate attached to the actuating piston.

Despite the aforesaid improvements mentioned for the apparatus covered by the Claassen patent, the fabrication of press bending molds for shaping glass sheets remained an expensive undertaking, particularly in the production of several different sample patterns which automotive stylists require for evaluation prior to deciding which of the patterns will be needed for mass production purposes. The extraordinary expense involved in fabricating different press bending molds for each evaluated pattern is further increased by the fact that when the prior art techniques of attaching the attachment means to the rear surface of the relatively flexible, metal shaping plate or frame by welding or soldering, the previous smoothness of the curve defined by the shaping plate becomes distorted. In order to restore the surface smoothness of the shaping plate in the vicinity of the attachment weld or solder point, it becomes necessary to grind localized portions of the shaping plate, inspect the ground portion and repeat the grinding and inspecting until surface smoothness is restored. Such procedures as grinding and measuring repeatedly for each weld or solder point is extremely time consuming and the expense is not justified, particularly in the final adjustment of the shaping plates for a press bending mold that is destined for limited use to produce at most only a small number of evaluation samples of a bent glass pattern that are eliminated when the car styling is decided.

Other patents relating to molds to press bend glass sheets to shape that include a flexible shaping plate and a spaced reinforcement plate reported in a novelty search of the present invention include U.S. Pat. No. 3,512,953 to Roseman, U.S. Pat. No. 3,819,351 to Shaffer and Plank, U.S. Pat. No. 4,052,185 to Kolakowski, U.S. Pat. Nos. 4,052,188 and 4,082,530 to Seymour and U.S. Pat. No. 4,108,624 to Claassen. Also, the novelty search reported U.S. Pat. No. 4,018,589 to Egbert and McDonald and U.S. Pat. No. 4,071,345 for showing the use of aluminum instead of other metals and materials in glass sheet shaping molds. None of these patents teach the glass sheet bending art how to eliminate localized distortion where attachment means are bonded to the rear surface of an adjustable shaping plate or frame.

SUMMARY OF THE INVENTION

The present invention provides a novel technique for producing press bending molds without introducing localized distortions in the relatively flexible shaping plates or frames that result from the use of soldering or welding techniques for attaching the attachment means to the rear surface of the shaping plate or frame of a press bending mold. According to the present invention, the attachment means is bonded to the rear of the shaping plate at a much lower temperature than is required for welding or soldering, thereby minimizing the severity of localized distortions in the relatively flexible shaping plate of a press bending mold.

According to this invention, a thin, relatively flexible, shaping plate or frame is first shaped to approximately its desired shape and a plurality of attachment means is bonded to the rear surface of the shaping plate with an adhesive applicable at a low temperature and capable of retaining a bond in the temperature range to which the press bending mold becomes heated during use. In a specific embodiment of this invention, the attachment means comprises a threaded rod having its rear end extending through an opening in a front reinforcing gate with means to attach the threaded rod to the grate in an axially adjustable position relative thereto, a clevis secured to the front end of the threaded rod, a T-shaped member pivotally attached to said clevis and having a head. The head is bonded to the rear surface of the relatively flexible shaping plate or frame using an adhesive capable of application and bonding at a low temperature range that preferably includes normal room temperature. A preferred adhesive is an epoxy resin.

When both the T-shaped members and the shaping plate or frame are made of aluminum, an epoxy resin containing aluminum filler is particularly effective to maintain the head of the T-shaped member bonded to the rear surface of the shaping plate or frame of the press bending mold. The epoxy resin adhesive retains its adhesive properties even though the press bending mold is located in the vicinity of a furnace exit.

Each glass sheet to be shaped leaves the furnace at a temperature high enough for the glass sheet to be in a heat-softened condition. Nevertheless, despite the close adjacency of the press bending mold to the furnace exit, the epoxy resin adhesive remains operative for an extended period in producing evaluation samples, leading one to be optimistic of its ability to remain operative over a longer period of time and under more stringent conditions existing during mass production.

Another feature optionally incorporated in this invention is the use of a thicker but lighter rigid back grate to replace the heavier attachment plate of the apparatus of the Seymour and Claassen patents. Another optional feature of this invention involves the use of lighter weight materials, such as aluminum, for the shaping plate and aluminum or fiber glass reinforced resin for the front or rear back grates. When the attachment means has a surface composed of aluminum to be bonded to an aluminum shaping plate or frame, the present invention prefers an adhesive of an epoxy resin containing a filler of aluminum powder.

The reader will understand the present invention more fully in the light of a description of an illustrative embodiment that follows. In the description of the embodiment that follows, the term "front" is used in conjunction with a structural element forming part of a press bending mold that is closer to a glass sheet being shaped and the terms "rear" or "back" are used in conjunction with a structural element for a press bending mold that is more distant from the glass sheet being shaped.

BRIEF DESCRIPTION OF THE DRAWINGS

In the drawings which form part of the description of this illustrative embodiment and wherein like reference numerals refer to like structural elements.

FIG. 3 is an enlarged, fragmentary, end view of a portion of a press bending mold with part of the cover and certain other parts removed to show other parts in section;

FIG. 4 is an enlarged, fragmentary end view taken at right angles to the view of FIG. 3 with parts omitted to show other parts in section; and FIG. 5 is a fragmentary, enlarged plan view of the portion of the press bending apparatus depicted in FIGS. 3 and 4, also with parts omitted, showing the mold construction according to the illustrative embodiment of the present invention.

DESCRIPTION OF PREFERRED EMBODIMENT

Figure 2:
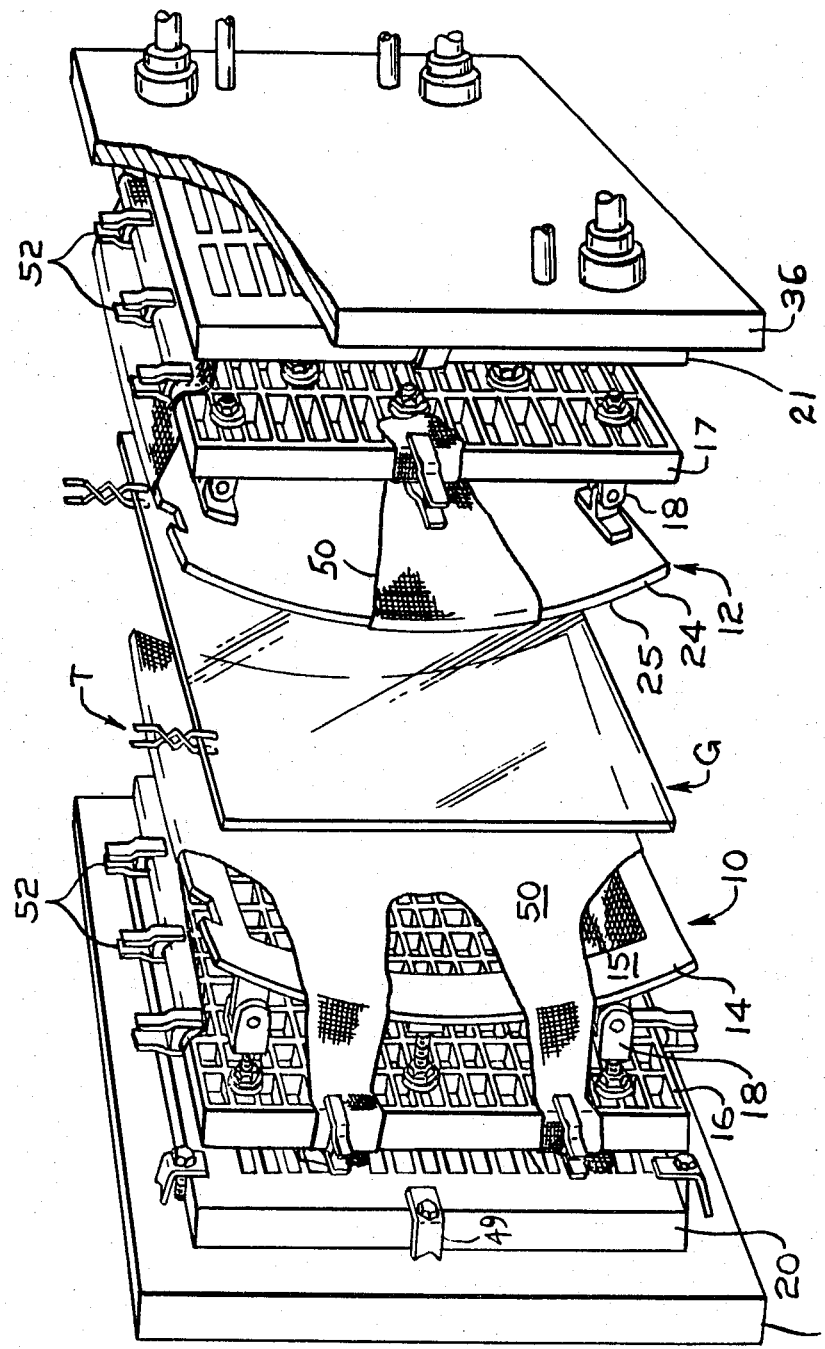
FIG. 2 is a fragmentary, perspective view of the apparatus of FIG. 1 showing two embodiments of typical press bending molds in opposing relation to one another, with certain parts omitted to show other parts more clearly.

The glass shaping apparatus illustrating the present invention comprises a concave shaping mold 10 and a convex shaping mold 12. As seen in FIG. 2, the concave shaping mold 10 comprises a relatively flexible shaping frame 14, having a concave shaping surface 15 facing forward in one direction. A relatively rigid member in the form of a rigid, front grate 16 is disposed in spaced relation behind the shaping frame 14 by means of a series of attachment means 18 distributed throughout the marginal portion of the grate to connect the grate 16 to the shaping frame 14. A rigid back grate 20 is connected in spaced relation to the rigid front grate 16 by a plurality of rigid, elongated, adjustable connecting means 22 in the form of externally threaded mounting shafts secured to the front and rear surfaces of grates 16 and 20 by nuts and washers.

The convex shaping mold 12 comprises a relatively flexible shaping plate 24 having a convex shaping surface 25 complementary to that of the shaping frame 14 of the concave shaping mold 10. A relatively rigid member in the form of another rigid front grate 17, attachment means 18 connecting the relatively rigid grate 17 to the rear of and in spaced relation to shaping plate 24, a rigid back grate 21 and additional connecting means 22 connecting the rigid back grate 21 to the relatively rigid front grate 17 are associated with the convex shaping mold 12 in a manner similar to how the like elements are associated with the concave shaping mold 10.

The term "shaping member" is used in this specification to denote either a shaping frame 14 or a shaping plate 24. Both are sufficiently thin to be relatively deformable compared to the front grates 16 and 17 and the back grates 20 and 21. In order to minimize the mass of the mold, the relatively deformable shaping members are made of a flexible light-weight metal, such as aluminum sheeting thin enough to be deformable in the direction of its thickness. The shaping members have shaping surfaces whose shape approximates that of the shape desired for the glass sheet after bending and are sufficiently thick to resist deformation during pressurized engagement against a heat-softened glass sheet. To further minimize the mass of the mold consistent with the requirements for rigidity, the grates 16, 17, 20 and 21 are composed of a light weight material such as aluminum or fiber glass reinforced thermosetting plastic in sufficient thickness to assure structural rigidity. The openings in the grates are sufficiently large in area to cause the weight of each grate to be less than that of a reinforcing plate that it replaces.

Figure 1:
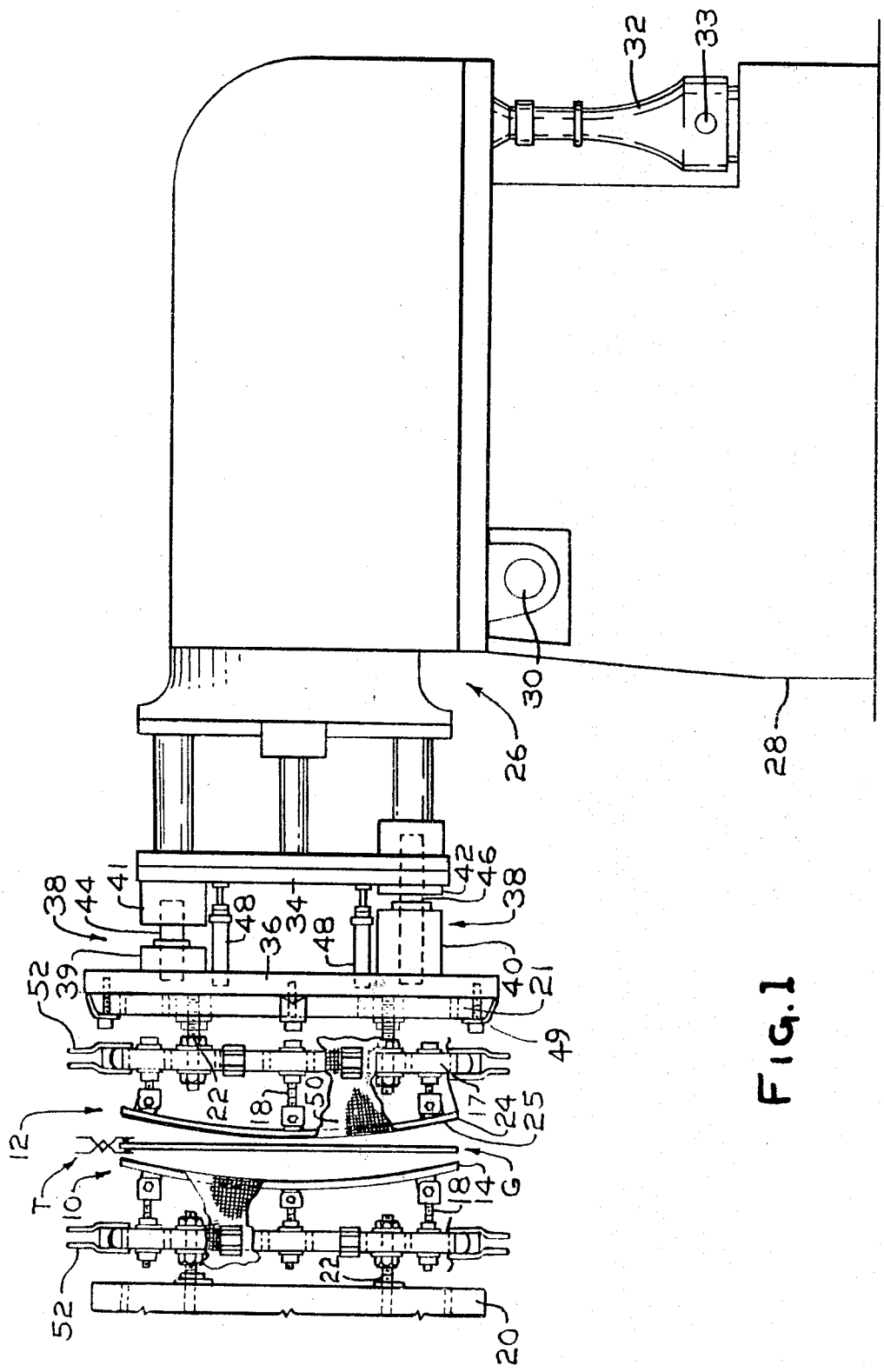
FIG. 1 is a fragmentary end elevation of an embodiment of the invention showing one press bending mold of press bending apparatus and its reinforcing metal grate system attached to a mold actuating means and sufficient structure of an opposing press bending mold to indicate how a pair of opposing press bending molds are positioned relative to one another.

A piston assembly 26 (shown in FIG. 1 attached to the rear of convex shaping mold 12) is provided for each of the shaping molds 10 and 12. Each piston assembly 26 is supported on a piston support structure 28. The shaping mold 10 or 12 and its attached piston assembly 26 is pivotally mounted about a horizontal pivot 30. A vertically adjustable piston 32 whose housing is pivotally mounted to the piston support 28 at pivot 33 supports the rear end of piston assembly 26. Vertical adjustment of piston 32 permits the entire shaping mold and its actuating piston assembly 26 to pivot with respect to the axis of pivot 30 to orient the shaping molds in a manner well known in the art. This enables the shaping surface of the mold to be oriented to any angle desired with respect to the vertical plane in which a glass sheet G is suspended from tongs T for the shaping operation.

The front end of the piston assembly 26 is attached to a piston actuated plate 34. The latter is aligned with a piston plate 36 through a plurality of alignment couplings 38. The alignment couplings 38 between plates 34 and 36 comprise guide blocks 39 and 40 attached to the rear of plate 36 and guide blocks 41 and 42 aligned exactly with guide blocks 39 and 40 respectively, and attached to the front surface of plate 32. Rods 44 extend loosely between aligned guide blocks 40 and 42. A spring loaded coupling 48 is connected between the piston actuated plate 34 and the piston place 36 in the vicinity of each alignment coupling 38.

Peripherally spaced attachment means 49 secure rigid back grates 20 and 21 to the piston plates 36. This enables the shaping molds 10 and 12 to move relative to one another and an interposed glass sheet G when pistons 26 are actuated.

Each shaping mold is provided with a cover 50 in direct contact with the shaping surface 15 or 25. The cover 50 is preferably of a material that does not harm glass at elevated temperatures. Preferably, the material for the cover is a stretchable fiber glass cloth composed of texturized yarns. A number of closely spaced clamps 52 are mounted around the periphery of the relatively rigid metal grate 16 or 17 to clamp the cover 50 in position where it is in unwrinkled condition against the shaping surface 15 or 25 which it covers.

While the present invention is susceptible of making slight modifications in the shaping surface by changing the contour of the relatively flexible shaping frame 14 and shaping plate 24, it is also desirable to provide means for rapidly changing from one glass shaping member to another when the pattern to be manufactured differs radically from one previously manufactured. This rapid change is accomplished by providing easy access for a tool to reach each attachment means 18 to facilitate the removal of shaping frame 14 from one shaping mold 10 and the removal of its complementary shaping plate 24 from the other shaping mold 12 and to replace the shaping frame 14 and shaping plate 24 of one pattern with corresponding elements of different shape of a different pattern.

Each attachment means 18 comprises a threaded rod 60 having its rearward end extending through an opening in a grate 16 or 17. An adjustment nut 62 is screwed onto the threaded rod 60 behind the grate while another adjustment nut 64 is screwed onto the threaded rod 60 in front of the grate. Washers 66 are provided on each side of the grate. The front end of the threaded rod 60 is secured to a clevis 68. The latter, in turn, is pivotally attached to an apertured stem 78 of a T-shaped member 74 whose head 76 is rigidly bonded by epoxy resin to the rear surface of the frame 14 or shaping plate 24. The clevises 68 are provided with apertured walls 79 having aligned apertures that receive pin 81 extending through stem 78. Some of the walls 79 are provided with aligned slots to permit certain T-shaped members 74 to move in response to thermal expansion of the shaping plate 24 as explained in detail in the previously mentioned Seymour U.S. Pat. No. 3,367,764 to Seymour.

The grates 16 and 17 are adjustably attached to back grates 20 and 21, respectively, by mounting bolts 22 having threaded nuts fixed therearound in front of and behind a front grate 16 or 17 and additional threaded nuts fixed therearound on opposite sides of a back grate 20 or 21. The openings throughout the grates make it easy for an operator to observe what he is doing when he adjusts a shaping frame or shaping plate relative to its attached grate or when he replaces a shaping frame or shaping plate relative to its attached grate.

Each grate is composed of bars one inch (2.54 cm.) wide and 3/16 inch (0.48 cm.) thick arranged in parallel relation to one another to form rectangular openings about ¾ inch (1.9 cm.) wide and 4 inches (10.16 cm.) long. The front gates are attached to the back grates and the shaping frame 14 or shaping plate 24 is readily removed from the associated front grate by rotating adjustment nuts 62 in the proper direction. A replacement shaping frame 14 or shaping plate 24 is then attached to the front grid 16 or 17 by inserting the various threaded rods 60 extending from the rear of the replacement shaping plate or replacement shaping frame through appropriate rectangular openings in the front grates, applying washers 66 and an adjustment nut 62 to each threaded rod 60 until the replacement shaping frame or replacement shaping plate is in position relative to the front grate 16 or 17.

The threaded rods 60 are of sufficient length so that the grate is spaced about 6 inches (15.24 cm.) behind the shaping plate or shaping frame. Also, the mounting bolts 22 are of sufficient length to space the front grate 16 or 17 about 6 inches (15.24 cm.) in front of the corresponding back grate 20 or 21. Thus, sufficient space is provided to insert a wrench needed to adjust the nuts 62 and 64 whenever the shaping plate 24 needs fine adjustment. Of course, access to the nuts is facilitated to provide removal and replacement as well.

In an illustrative embodiment of the present invention, the metal shaping plate 24 or shaping frame 14 is ⅛ inch (3.2 mm.) thick and the reinforcing front grates 16 and 17 and rear grates 20 and 21 oriented to have a thickness of one inch (2.54 cm.) in the direction of movement of the shaping members 10 and 12 compared to a typical thickness of a solid reinforcement plate of ½ inch (1.27 cm.), or twice the thickness of the shaping plate in the prior art. The thickness of the grate should be more than three times that of the shaping plate or frame to provide rigidity previously obtained by a solid reinforcement plate having twice the thickness of the shaping plate because of the rectangular openings throughout the grid. However, the open area of the grid should be sufficient to provide a rigid structure having less mass per unit area than a solid plate of lesser thickness, such as half the thickness, of the grate.

The attachment means 18 of mold 10 are bonded to the rear surface of the relatively flexible shaping frame 14 by an epoxy resin. Similarly, the attachment means 18 of mold 12 are bonded to the rear surface of the relatively flexible shaping plate 24 by an epoxy resin. Prior to the present invention, the attachment means were welded or soldered to the relatively flexible shaping members 14 and 24 and both the attachment means and shaping members were made of steel to facilitate welding or smoldering. Since welding or soldering is accomplished at an elevated temperature, the localized portions of the shaping frame 14 and shaping plate 24 that were soldered or welded became distorted due to the localized application of heat and each area of distortion required considerable grinding alternating with inspecting and measuring to determine whether the distortion had been corrected before the shaping plate or shaping frame was again suitable for use in a press bending mold.

A thermosetting adhesive is desirable, particularly one capable of application at room temperature that is subject to a relatively rapid cure at a temperature below its expected service temperature and that does not disintegrate when used on a press bending mold for shaping glass sheets when applied to the rear surface of its shaping plate or frame.

Of those adhesives presently available, epoxy resins have been found to be most suitable. A particularly effective epoxy resin for bonding aluminum attachment means to an aluminum shaping plate or frame is a one-component, grey, aluminum-filled, thixotropic, non-sag, epoxy adhesive sold by Armstrong Products Company, P. O. Box 647, Warsaw, Indiana 46580 under the trademark A-706. Such a resin has an indefinite work life at 77° F. (25° C.), has a mixed viscosity of 160,000 centipoises, cures in 10 minutes at 500° F. (260° C.) and in 2 hours at 350° F. (177° C.), has a tensile shear strength between aluminum surfaces of 4620 psi (31.85 million Pascals) at room temperature, 4330 psi (29.86 million Pascals) at 180° F. (82° C.) and 4300 psi (29.65 million Pascals) at −60° F. (−51° C.), a bond strength of 2400 psi (16.55 million Pascals) and a cleavage of 4310 psi (29.72 million Pascals).

Many other epoxy resin adhesives having the requisite thermosetting properties and various other physical and chemical properties desirable are available commercially to bond similar or dissimilar surfaces to one another for service at the elevated temperature range commonly experienced by press bending molds that shape heat-softened glass sheets in the vicinity of the exit of a heating furnace. The benefit of this invention lies in the discovery that epoxy resin adhesive compositions can be applied to press bending mold structures at room temperature without distorting the shaping member, that the epoxy resin compositions can cure at temperatures below the service temperature range of the press bending molds and that the resulting epoxy resin bond does not decompose or disintegrate at the service temperature of the molds.

The form of the invention shown and described in this disclosure represents a preferred illustrative embodiment thereof that avoids the local distortion areas of prior art press bending molds due to the need to heat the shaping frame locally to provide a weld or a solder connection between the shaping plate or frame and means connecting said plate or frame to a reinforcing grate. While adhesives applicable at low temperature that cure at a temperature below the service temperature of the press bending mold and that do not disintegrate at the service temperatures associated with press bending molds in glass sheet shaping operations have been recited in terms of epoxy resin adhesives and, in cases where the shaping frame or plate and the surface of the attachment means are composed of aluminum, in terms of epoxy resins having powdered aluminum filler, it is understood that various changes may be made without departing from the gist of the invention as defined the claimed subject matter that follows.

We claim:
1. Apparatus for press bending a heat-softened glass sheet by pressurized engagement thereagainst comprising:
   1. a metal member deformable in the direction of its thickness and having a shaping surface whose shape approximates that of the shape desired for the glass sheet after bending and having sufficient rigidity to resist deformation during pressurized engagement against a heat-softened glass sheet,
   2. a relatively rigid member more rigid that said metal member located in spaced relation behind and in facing relation to said metal plate, and comprising a grate with a plurality of elongated openings therein,
   3. adjustable attachment means distributed in spaced relation throughout the area of said deformable member and said relatively rigid member by which the shape of said deformable member may be altered, and
   4. an organic thermosetting adhesive bonding said adjustable attachment means to the rear surface of said deformable metal member.

2. Apparatus as in claim 1, wherein said adhesive consists essentially of an epoxy resin.

3. Apparatus as in claim 2, wherein said deformable metal member and said attachment means have bonding surfaces composed of aluminum and said epoxy resin adhesive contains a finely divided aluminum filling.

4. Apparatus as in claim 1, wherein said deformable metal member is in the form of a frame.

5. Apparatus as in claim 1, wherein said deformable metal member is in the form of a solid plate.

6. Apparatus as in claim 1, further including an additional grate spaced an adjustable distance behind said first named grate.

7. Apparatus as in claim 6, wherein said first named grate and said additional grate have open areas sufficient to provide less mass per unit area than the total mass of a pair of solid plates, each having half the thickness of and the same outline area as that of its corresponding grate.

* * * * *